(12) United States Patent
Van Oossanen

(10) Patent No.: US 10,759,496 B2
(45) Date of Patent: Sep. 1, 2020

(54) VESSEL FOR OPERATING ON A BODY OF WATER, COMPRISING AN AFT FOIL FOR GENERATING A THRUST FORCE AND ADJUSTMENT MEANS FOR ADJUSTING AN ANGLE OF INCIDENCE OF THE AFT FOIL

(71) Applicant: Van Oossanen & Associates B.V., Wageningen (NL)

(72) Inventor: Pieter Van Oossanen, Wageningen (NL)

(73) Assignee: Van Oossanen & Associates B.V., Wageningen (NA)

( * ) Notice: Subject to any disclaimer, the term of this patent is extended or adjusted under 35 U.S.C. 154(b) by 0 days.

(21) Appl. No.: 16/327,191

(22) PCT Filed: Aug. 24, 2017

(86) PCT No.: PCT/NL2017/050555
§ 371 (c)(1),
(2) Date: Feb. 21, 2019

(87) PCT Pub. No.: WO2018/038611
PCT Pub. Date: Mar. 1, 2018

(65) Prior Publication Data
US 2019/0210692 A1  Jul. 11, 2019

(30) Foreign Application Priority Data

Aug. 26, 2016 (NL) ..................................... 2017379

(51) Int. Cl.
*B63B 1/28* (2006.01)
*B63B 1/32* (2006.01)
(Continued)

(52) U.S. Cl.
CPC ................ *B63B 1/285* (2013.01); *B63B 1/04* (2013.01); *B63B 1/08* (2013.01); *B63B 1/246* (2013.01);
(Continued)

(58) Field of Classification Search
CPC .... B63B 1/16; B63B 1/18; B63B 1/20; B63B 1/22; B63B 1/24; B63B 1/242;
(Continued)

(56) References Cited

U.S. PATENT DOCUMENTS 2,749,870 A * 6/1956 Vavra ........................ B63B 1/30
114/282
2,914,014 A * 11/1959 Carl ........................... B63B 1/30
114/281
(Continued)

FOREIGN PATENT DOCUMENTS

DE 39 36 280 A1 5/1991
JP 11-180379 7/1999
(Continued)

*Primary Examiner* — Daniel V Venne
(74) *Attorney, Agent, or Firm* — Nixon Peabody LLP

(57) ABSTRACT

The invention relates to a vessel (1) comprising a hull (2) for non-planing operation, during operation displaying a waterline (3) and having a forward direction in a horizontal plane (4) with a forward portion, an aft portion (5), and a central portion, the aft portion having a smaller water displacement relative to a water displacement of the central portion; and an aft, primary foil (6) affixed to the aft hull portion with a connecting member (7), configured to be below the waterline during operation, spaced from the hull, the aft foil having a span, a chord, a profile, a leading edge (8) and a trailing edge (9) relative to the forward direction, characterized by adjustment means (10) connected to the aft foil and configured for adjusting an angle of incidence ($\beta_{c,\,af}$) of the chord of the aft foil.

15 Claims, 9 Drawing Sheets

(51) Int. Cl.
*B63B 1/08* (2006.01)
*B63H 19/00* (2006.01)
*B63B 39/06* (2006.01)
*B63B 1/40* (2006.01)
*B63B 1/04* (2006.01)
*B63B 1/24* (2020.01)
*B63H 5/00* (2006.01)

(52) U.S. Cl.
CPC .................. *B63B 1/32* (2013.01); *B63B 1/40* (2013.01); *B63B 39/06* (2013.01); *B63H 5/00* (2013.01); *B63H 19/00* (2013.01); *B63B 2039/067* (2013.01); *Y02T 70/12* (2013.01); *Y02T 70/125* (2013.01); *Y02T 70/127* (2013.01)

(58) Field of Classification Search
CPC ........... B63B 1/248; B63B 1/28; B63B 1/285; B63B 1/286; B63B 1/30; B63B 2001/16; B63B 2001/18; B63B 2001/20; B63B 2001/24; B63B 2001/28; B63H 5/00; B63H 2005/00; B63H 1/30; B63H 1/32; B63H 2001/30

USPC ............ 114/271, 274–280; 440/1, 13, 16–20
See application file for complete search history.

(56) References Cited

U.S. PATENT DOCUMENTS

| | | | | |
|---|---|---|---|---|
| 3,347,197 | A | * | 10/1967 | Scherer .................. B63H 11/08 114/278 |
| 5,653,189 | A | * | 8/1997 | Payne ...................... B63B 1/28 114/274 |
| 6,439,148 | B1 | * | 8/2002 | Lang ...................... B63B 1/248 114/272 |
| 2007/0157864 | A1 | * | 7/2007 | Aldin ..................... B63B 1/107 114/281 |

FOREIGN PATENT DOCUMENTS

WO   WO 1996/040547   12/1996
WO   WO 2007/148966   12/2007

* cited by examiner ns a national stage of Application No. PCT/NL2017/050555 filed Aug. 24, 2017, which claims priority from Netherlands Application No. 2017379 filed Aug. 26, 2016, which are both incorporated by reference in their entireties.

VESSEL FOR OPERATING ON A BODY OF WATER, COMPRISING AN AFT FOIL FOR GENERATING A THRUST FORCE AND ADJUSTMENT MEANS FOR ADJUSTING AN ANGLE OF INCIDENCE OF THE AFT FOIL

CROSS-REFERENCE TO RELATED APPLICATION

This application is a national stage of Application No. PCT/NL2017/050555 filed Aug. 24, 2017, which claims priority from Netherlands Application No. 2017379 filed Aug. 26, 2016, which are both incorporated by reference in their entireties.

FIELD OF THE INVENTION

The present invention relates to a vessel for operating on a body of water comprising:
- a hull, designed for non-planing operation on the water body, during operation displaying a waterline and having a forward direction in a horizontal plane with a forward portion, an aft portion, and a central portion, the hull being configured to have the aft portion with a smaller water displacement relative to a water displacement of the central portion; and
- an aft, primary foil affixed to the aft hull portion with one or more connecting members, configured to be below the waterline during operation, and spaced from the hull, the aft foil having a span, a chord, a profile, a leading edge and a trailing edge relative to the forward direction, providing the aft foil with a configuration suitable for generating a lift force having a forwardly-directed thrust component.

BACKGROUND OF THE INVENTION

A stationary, aft foil oriented horizontally below the hull of a vessel, such as described in WO2004020276 A1, WO2007148966 A2 and/or WO2016010423 A1 by the present applicant, does not make optimal use of the energy that is present in the flow in developing thrust. At the location where the aft foil is fitted to ships (near the stern of the vessel) the flow is inclined aft and upwards. When the aft foil is positioned in this flow a lift force is developed at right angles thereto such that the horizontal component thereof constitutes a thrust force. The aft foil as disclosed in the above patent publications is presently optimized for the flow that is present when the vessel operates in calm water.

However, the vessel rarely operates in still water. The waves that are nearly always present along the routes that ships adopt cause the vessel to pitch, heave and roll. The effect thereof on the angle of inflow at the aft foil is significant, causing a large variation in the angle of incidence. When the depth of the aft foil below the water surface decreases (when a wave trough is present above the aft foil) the flow experiences an additional downward velocity component which reduces the angle of incidence, and when the depth of the aft foil below the surface increases (in the presence of a wave peak) the flow experiences an additional upwards velocity component which increases the angle of incidence.

For example, when a ship with a length of 100 m displays a pitching motion with a period of 5 seconds in seas which cause an average undulation of the water surface of 1 m at the location of the aft foil, when the horizontal component of the inflow is 7 m/s (for a ship speed of about 15 knots), the variation in the angle of incidence is some ±3.3 degrees and when the undulation is 2 m, about ±6.6 degrees. In actual fact this variation is about 60% higher because the vertical velocity component is not constant during one wave period but similar to a sine or cosine function. Furthermore, a ship rarely displays a pure pitching motion. Usually it also heaves and rolls and these motions also influence the direction of the inflow near the stern of a vessel. Thus, to constantly obtain the best lift-to-drag ratio from the aft foil—or the maximum thrust (whichever might be the case), the angle of attack of the foil needs to be constantly adapted to the direction of the inflow below the hull. An object of the invention is thus to provide an aforementioned vessel with an aft foil for generating a lift force—with a forwardly directed thrust component—wherein the angle of attack of the foil can be (constantly) adapted to the direction of the inflow below the hull.

SUMMARY OF THE INVENTION

Hereto, according to the invention the vessel is characterized by adjustment means connected to the aft foil and configured for adjusting an angle of incidence ($\beta_{c,\,af}$) of the chord of the aft foil.

Due to the provision of the aforementioned adjustment means the angle of attack at which the incoming flow meets the aft foil can be advantageously influenced allowing the aft foil to achieve optimal lift-to-drag ratios or maximum thrust.

In the context of the present application "angle of incidence" refers to an angle of a chord of a (respective) foil with respect to the horizontal plane aligned with the longitudinal axis of the vessel or an angle of the incoming flow with respect to the horizontal plane of the vessel. The expression "angle of attack" is to be interpreted as being the angle between the incoming flow and the chord of the (respective) foil. The expression "estimation" means that the angle of incidence of the incoming flow upstream of the aft foil can also be obtained via more or less indirect means, i.e. instead of via (direct) measurement, for instance by taking the oscillatory motions of the vessel into account, such as the period of the pitching motion—based on the oscillatory motions of the vessel the angle of incidence of an incoming flow upstream of the aft foil can then be derived or estimated, for instance by means of calculation, to obtain the highest possible thrust from the aft foil.

In particular when the angle of incidence of the chord of the aft foil is to change according to a cyclic pattern, wherein the aft foil is required to perform a flapping motion, accurate estimation or measurement of the angle of incidence of the incoming flow upstream of the aft foil proves to be crucial to obtain optimal propulsive performance.

It should be noted that WO 96/40547 describes a high-speed hydrofoil craft with a planing hull supported by one or more hydrofoils provided with adjustment means. Hydrofoil craft operate at very high speeds causing cavitation on the submerged foils leading to decreased performance and vertical accelerations imparted on the hull by the foils which decrease passenger comfort. By adjustment of the angle of attack of the hydrofoils the occurrence of cavitation is stated to be less. The problem WO 96/40547 seeks to address is thus related to hydrofoil vessels that are lifted above the water surface which is different to the problem addressed by the present invention.

DE 39 36 280 A1 discloses a vessel with an aft foil to be submerged in the vessel's wake to improve propulsion or to reduce wave motions. According to the publication, the angle of incidence of the aft foil can be changed. The publication, however, does not disclose how to do this.

JP H11 180379 describes a vessel provided with two or more foils arranged in tandem behind the hull at a specific, non-adjustable angle of attack, for the purpose of reducing the height of the stern backwash. An embodiment relates to an aforementioned vessel, wherein the adjustment means are arranged for rotating the aft foil around a center of pressure, at or near a quarter-chord location of the aft foil. It is preferred to arrange the adjustment means in such a way that the aft foil rotates around this location of the center of pressure so that the lift force on the aft foil does not result in a moment around the center of rotation. This location is approximately at the so-called quarter-chord point (which location is to be verified for each configuration).

An embodiment relates to an aforementioned vessel, wherein the aft foil is provided with a shaft aligned in bearings extending in a span-wise direction of the aft foil, through the center of pressure of the aft foil, wherein the adjustment means are configured for rotating the aft foil around the shaft. With reference to the previous paragraph, it is preferred to fit the shaft in the aft foil at the location of the center of pressure so that the lift force thereon does not result in a moment about this shaft. The shaft can be held fast in struts affixed to the transom of the vessel.

An embodiment relates to an aforementioned vessel, wherein the adjustment means are connected to a control system configured to allow for controlling the angle of incidence ($\beta_{c,\ af}$) of the chord of the aft foil according to a cyclic pattern, whereby the aft foil can perform a flapping motion for propelling the vessel. Such an embodiment could be referred to as a "powered, direct lift-control configuration" and may be adopted when the angle of attack of the aft foil is to be controlled independently of the value of the inflow incidence angle. A flapping motion of the aft foil will augment the thrust thereof considerably.

An embodiment relates to an aforementioned vessel, wherein the adjustment means are fitted with a stop device to limit the minimum and maximum angles of incidence ($\beta_{c,\ af\text{-}min}$, $\beta_{c,\ af\text{-}max}$) of the chord of the aft foil, for example −2 and +2 degrees, respectively. By fitting such a stop device the minimum and maximum angles of attack can be controlled (please note that the abovementioned values of −2 and +2 degrees relate to the autonomous configurations, not to the powered configurations).

An embodiment relates to an aforementioned vessel, wherein a secondary foil is connected to the aft foil, upstream of the aft foil, by means of a connection device. The inventor has found that the difficulty of obtaining the highest possible thrust from the aft foil is not necessarily the matter involving the rotation of the aft foil around some transverse axis, but the determination of the inflow angle to which the orientation of the aft foil needs to be adapted. The direct measurement thereof at a specific location (by a device such as a Pitot tube for example) is not difficult but because of the considerable variation of the inflow angle in a spatial sense, in an area corresponding to the dimensions of the aft foil, a single point location for this direct measurement is not at all representative of the effective inflow angle. That problem can be overcome by adopting a secondary foil in front of the aft foil. The lift on this secondary foil is directly related and representative of the effective inflow angle. The lift on the secondary foil can be advantageously used as a guide or sensor for setting the value of the angle of attack of the aft foil. At the same time this secondary foil allows for the fitting of an actuating mechanism permitting the active (powered) control of the aft foil.

The principle involved is related to a technique known in the literature as "direct lift-control" and is based on actively adjusting the angle of attack of a foil to obtain the desired lift. By connecting the secondary foil to the aft foil and by fitting e.g. a shaft aligned in bearings transversely in the secondary foil, similarly to the shaft fitted in the aft foil, the latter is able to rotate upwards by the leading edge when an upward lift on the secondary foil leads to an upwards movement thereof. When no further actuating mechanisms are used (i.e. the aft foil and/or secondary foil are not driven or powered), this embodiment could be referred to as an "autonomous direct lift-control configuration".

The principle thereof is simply that when the inflow is directed aft and upwards the secondary foil is pushed upwards to its maximum setting e.g. as controlled by the stop device on the shaft of the aft foil. Similarly, when the inflow angle is such that the secondary foil experiences a downwards lift the secondary foil moves to its minimum (downwards) setting forcing the aft foil to do likewise. Although these settings are a compromise compared to a mechanism allowing for a finer adjustment this arrangement does allow for the aft foil to benefit from large changes in inflow angle—specifically when the inflow angle regularly becomes negative. Another benefit thereof is that the mechanism is simple and fool-proof.

An embodiment relates to an aforementioned vessel, wherein the secondary foil is connected to the aft foil by means of a connection device configured for allowing the chord of the secondary foil to keep its angle of incidence ($\beta_{c,\ sf}$) irrespective of the angle of incidence of the chord of the aft foil ($\beta_{c,\ af}$) to which the secondary foil is connected, preferably an angle of incidence of around 0 degrees (i.e. aligned with the horizontal plane). Thus, the secondary foil experiences a downwards directed force as soon as the inflow angle becomes negative (i.e. directed aft and downwards). This is preferable, because the "autonomous direct lift-control configuration" described above will not function as desired in the range of inflow angles in the range of the stop adjustment (for example between 0 and ±2 degrees). A solution to this problem may be sought by fitting e.g. a double-hinge device in the secondary foil that would allow the secondary foil to keep its horizontal attitude irrespective of the angle of attack of the aft foil.

An embodiment relates to an aforementioned vessel, wherein the secondary foil has a smaller span and/or a smaller chord length than the aft foil. The inventor has found that only a relatively small lift force is needed and desired on the secondary foil to control the angle of attack of the aft foil.

An embodiment relates to an aforementioned vessel, wherein the adjustment means comprises an actuating mechanism connected to the aft foil. Such an embodiment constitutes a "powered direct lift-control configuration", wherein, for example, the lift on the secondary foil is utilized to control the optimum time-varying orientation of the aft foil by means of for instance a hydraulically or electrically operated piston directly attached to the aft foil or the secondary foil.

Another embodiment thus relates to an aforementioned vessel, wherein the adjustment means comprises an actuating mechanism as described above connected to the secondary foil instead of to the aft foil.

An embodiment relates to an aforementioned vessel, wherein the actuating mechanism comprises one or more rod actuators or one or more piston/cylinder actuators. Such actuating mechanisms allow for a high degree of mechanical reliability and precision and can be easily powered by a motor, pump, et cetera, preferably arranged in the aft hull portion of the vessel.

An embodiment relates to an aforementioned vessel, wherein the aft foil and/or the secondary foil possess a symmetrical foil section. For the aft foil to perform optimally when large fluctuations in inflow angle occur it is necessary that the foil section is symmetrical, not possessing camber. The same applies to the secondary foil.

An embodiment relates to an aforementioned vessel, comprising two aft foils separated in a transverse direction of the vessel (i.e. comprising a port and starboard part), each aft foil being provided with separate adjustment means. In case the separate aft foils are each powered by an actuating mechanism, the aft foils are preferably independently activated by the actuating mechanisms to dampen both pitch and roll motions of the vessel. When the vessel rolls the inflow angles are no longer symmetrically disposed on port and on starboard so that port and starboard sides need separate activation. For operation in predominantly calm water though, the aft foil can be configured as a single foil straddling the width of the vessel. Analogously, the secondary foil can then be fitted on the centerline of the vessel.

An embodiment relates to an aforementioned vessel, wherein the connection device between the aft and secondary foils comprises a force or strain gauge to measure the lift force on the secondary foil. The relevant signal can be fed to an electronic controller which calculates the desired angle of attack of the aft foil, and the associated length of an associated piston, and feeds this signal to the actuating mechanism that e.g. deploys the piston. The stop on the shaft of the aft foil in this case is no more than a safety feature in not allowing for angles of attack, for example, leading to flow separation. The stop adjustment in this case might be as high as ±10 degrees or higher.

Another aspect of the invention relates to a method for operating an aforementioned vessel, comprising the step of operating the adjustment means for controlling the angle of incidence ($\beta_{c,\,af}$) of the chord of the aft foil.

An embodiment relates to an aforementioned method, comprising the step of adapting the angle of incidence ($\beta_{c,\,af}$) of the chord of the aft foil to an estimated or measured angle of incidence ($\beta_{if}$) of an incoming flow upstream of the aft foil, below the hull.

An embodiment relates to an aforementioned method, comprising the step of determining the angle of incidence ($\beta_{if}$) of the incoming flow upstream of the aft foil from a lift force exerted on the secondary foil, the lift force being directly related to the angle of incidence ($\beta_{if}$) of the incoming flow.

An embodiment relates to an aforementioned method, comprising the step of operating the control system to allow for controlling the angle of incidence ($\beta_{c,\,af}$) of the chord of the aft foil according to a cyclic pattern, whereby the aft foil can perform a flapping motion for propelling the vessel.

BRIEF DESCRIPTION OF THE DRAWINGS

The present invention will be explained hereafter with reference to exemplary embodiments of a vessel and a method according to the invention and with reference to the drawings. Therein.

DETAILED DESCRIPTION

Figure 1:
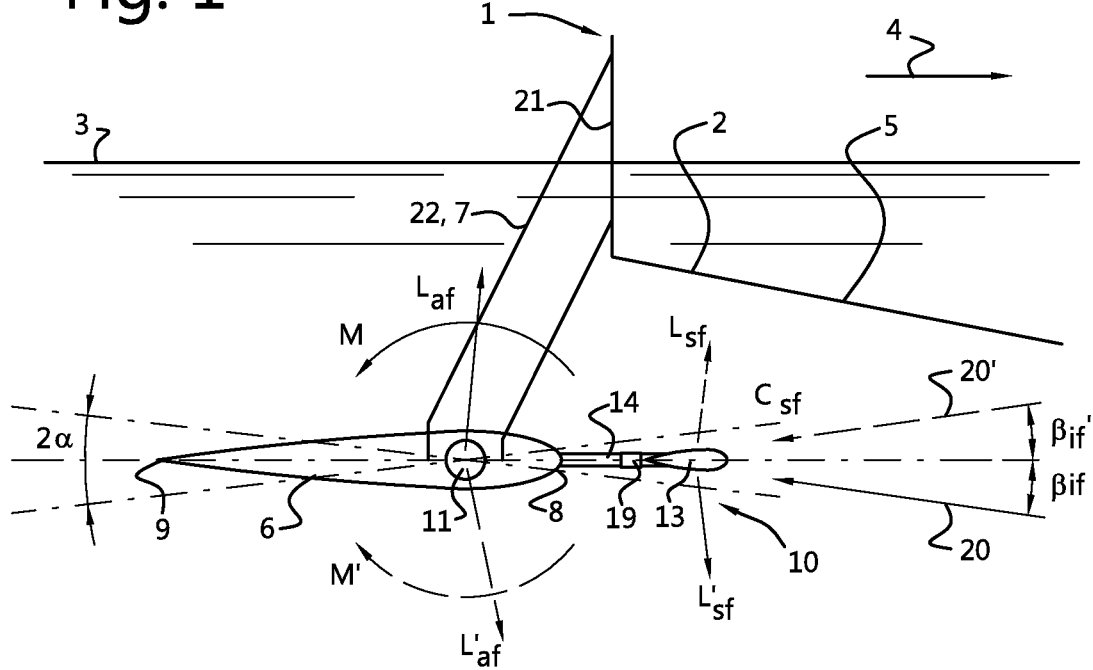
FIG. 1 shows a schematic cross-sectional side view of the autonomous lift-control configuration.

FIG. 1 shows a schematic cross-sectional side view of the autonomous lift-control configuration. FIG. 1 more specifically shows a vessel 1, such as a sailing yacht or boat or a motor-driven vessel, during operation on a water body with a waterline 3. Preferably, the non-planing vessel 1 according to the invention operates in a (relatively low) speed regime corresponding to a Froude number of lower than 0.5, such as lower than 0.4. A primary, aft foil 6 having a leading edge 8 and a trailing edge 9 is connected to an aft portion 5 of the hull 2 of the vessel 1, such as the transom 21, with one or more appropriate connection members 7, such as one or more struts 22, for instance having backward sweep as shown. The aft foil 6 is configured to be below the waterline 3 during operation and is spaced from the hull 2. The hull 2 is configured for non-planing operation, and has a forward direction in a horizontal plane 4, i.e. during operation the horizontal plane 4 will usually be aligned with the forward direction of the vessel 1 and the waterline 3. The aft portion 5 has furthermore a smaller water displacement relative to a water displacement of a central portion of the vessel 1. The aft foil 6 has a configuration suitable for generating a lift force ($L_{af}$, $L'_{af}$) having a forwardly-directed thrust component. The struts 22 connect to the aft foil 6 at the center of pressure, i.e. approximately at a distance of ¼ $L_{c,\,af}$ from the leading edge 8 of the aft foil 6. During operation, when the vessel 1 is moving in the forward direction, a flow is generated below the hull 2. The incoming flow 20, 20' has a certain angle of incidence $\beta_{if}$, $\beta'_{if}$ with respect to the horizontal plane 4. The chord $c_{af}$ of the aft foil 6 is orientated with respect to the horizontal plane 4 at an angle of incidence $\beta_{c,\,af}$, $\beta'_{c,\,af}$ (being 0 degrees in FIG. 1).

Upstream of the aft foil 6 adjustment means 10 are provided comprising a secondary foil 13 connected to the leading edge 8 of the aft foil 6 by means of a connection device 14. The adjustment means 10 are connected to the aft foil 6 and configured for adjusting the angle of incidence ($\beta_{c, af}$, $\beta'_{c, af}$) of the chord of the aft foil 6 and thus the angle of attack of the aft foil 6. The adjustment means 10 comprising the secondary foil 13 are arranged for rotating the aft foil 6 around a center of pressure of the aft foil 6, preferably at a quarter-chord location of the aft foil 6. Thereto, the aft foil 6 is provided with a shaft 11 extending in a span-wise direction of the aft foil 6 (i.e. perpendicular to the plane of the drawing), at the center of pressure of the aft foil 6. The secondary foil 13 is then configured for rotating the aft foil 6 around the shaft 11.

A lift force $L_{sf}$, $L'_{sf}$ will be generated on the secondary foil 13 by the incoming flow 20, 20'. The magnitude and direction thereof will depend on the speed and angle of incidence $\beta_{if}$, $\beta'_{if}$ of the incoming flow. The lift force $L_{sf}$, $L'_{sf}$ on this secondary foil 13 is directly related and representative of the effective inflow angle ($\beta_{if}$, $\beta'_{if}$). With the embodiment shown in FIG. 1, the lift force $L_{sf}$, $L'_{sf}$ on the secondary foil 13 can be advantageously used as a guide or sensor for setting the value of the angle of incidence and thus the angle of attack of the aft foil 6. The principle involved is related to a technique known in the literature as "direct lift-control" and it is based on actively adjusting the angle of attack of a foil to obtain the desired lift. By connecting the secondary foil 13 to the aft foil 6 and by fitting e.g. the shaft 11 aligned in bearings transversely in the aft foil 6, the latter is able to rotate upwards by the leading edge 8 when an upward lift on the secondary foil 13 leads to an upwards movement thereof (causing the aft foil 6 to be subjected to a moment M or M') and downwards by the leading edge 8 when a downwards lift on the secondary foil 13 leads to a downwards movement thereof. The configuration as shown in FIG. 1 could be referred to as an "autonomous direct lift-control configuration". To optimize performance, the leading edge 8 of the aft foil 6 and the trailing edge of the secondary foil 13 are preferably spaced apart at a distance of between 1.0-8.0 times, more preferably 1.0-4.0 times the chord length $L_{c, sf}$ of the secondary foil 13. Preferably, the secondary foil 13 has a smaller span ($b_{sf}$) and/or smaller chord length ($L_{c, sf}$) than the aft foil 6, such as a span $b_{sf}$ of 0.1-0.5 times, for instance 0.2-0.4 times, the span $b_{c, af}$ of the aft foil 6 and/or a chord length $L_{c, sf}$ of 0.1-0.5 times, for instance 0.2-0.4 times, the chord length $L_{c, af}$ of the aft foil 6. Preferably, the aft foil 6 and/or the secondary foil 13 have a symmetrical, streamlined foil section. The connection device 14 may also comprise a force or strain gauge 19 to measure the lift force on the secondary foil 13. Other measurement means or estimation means for measuring or estimating the angle of incidence of the incoming flow are also conceivable. For optimum accuracy, such measurement or estimation means are preferably to be arranged upstream of the aft foil 6, below the hull 2, such as at a position below the aft, narrowing/constricting portion 5 of the hull 2. Preferably, such means are arranged at an upstream distance from the leading edge 8 of the aft foil 6 of 1.0-4.0 times, more preferably 1.0-2.0 times the chord length $L_{c, af}$ of the aft foil 6. Alternatively, the estimation (means) may comprise the (indirect) derivation or calculation of the angle of incidence of the incoming flow based on, for instance, the oscillatory motions of the vessel, such as by means of a control system.

The position of the struts 22 may vary depending on the strength and stiffness requirements of the shaft 11. A particular strut configuration is that whereby the struts 22 are positioned at the tips of the aft foil 6, with a third strut situated in the symmetry plane of the aft foil 6 when the span of the aft foil 6 is otherwise too large (or when the port and starboard parts of the aft foil need to be separately activated). A particular two-strut configuration is that whereby the bending load in the shaft 11 is minimized, which requires the struts 22 to be located inboard from the tips of the aft foil 6 at a specific location.

Figure 2:
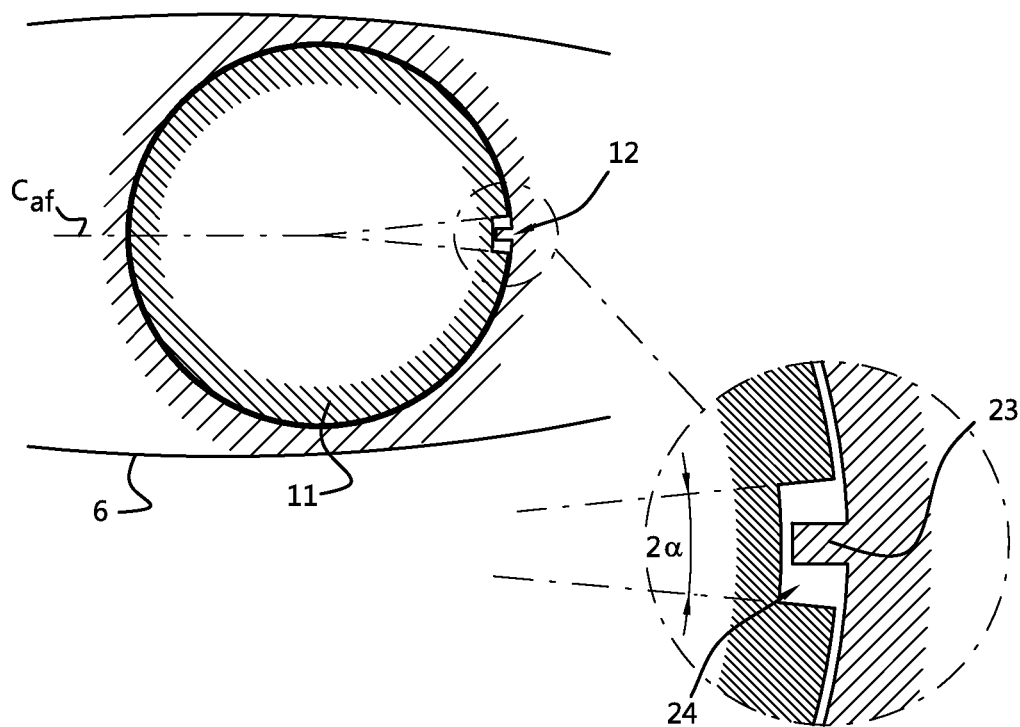
FIG. 2 shows a schematic cross-sectional side view of the stop device.

FIG. 2 shows a schematic cross-sectional side view of the stop device 12. The stop device 12 may comprise a cam 23 arranged on the non-rotating (non-shaft) part of the aft foil 6. Therein, the cam 23 is arranged inside a recess 24 of the shaft 11, wherein the recess extends in a circumferential direction along the circumference of the shaft 11. The length of the circumferential recess 24 is based on the maximum range of rotation permitted to the shaft 11 and could for instance be between −2 and +2 degrees with respect to the chord $c_{af}$ of the aft foil 6. In principle, the cam 23 and recess 24 combination could be arranged anywhere on the circumference of the shaft 11, but a location close to the chord $c_{af}$ is preferred.

The drawback of this system is that once the secondary foil 13 is in its highest or lowest position (and the aft foil 6 at its maximum, respectively, minimum angle of attack) the flow needs to change direction by an appreciable angle before the secondary foil 13 adopts the opposite position. This can be illustrated by an example as follows. Suppose the inflow angle is 5 degrees relative to the horizontal in the aft and upwards direction. The upwards directed lift on the secondary foil 13 will then push it upwards exerting a moment on the aft foil 6 forcing it to tilt up by the leading edge 8. When the stop device 12 on its shaft allows for an angle of attack setting of +2 degrees the aft foil 6 will adopt an angle of attack of +2 degrees when the shaft 11 passes through the location of the centre of pressure and the friction of the shaft 11 in its bearings is not significant. The angle of attack of the secondary foil 13 is now also at +2 degrees to the horizontal. It follows that for the secondary foil to adopt a lower position the inflow angle will need to change by more than 7 degrees (from +5 degrees upwards to an angle less than −2 degrees downwards).

Figure 3A:
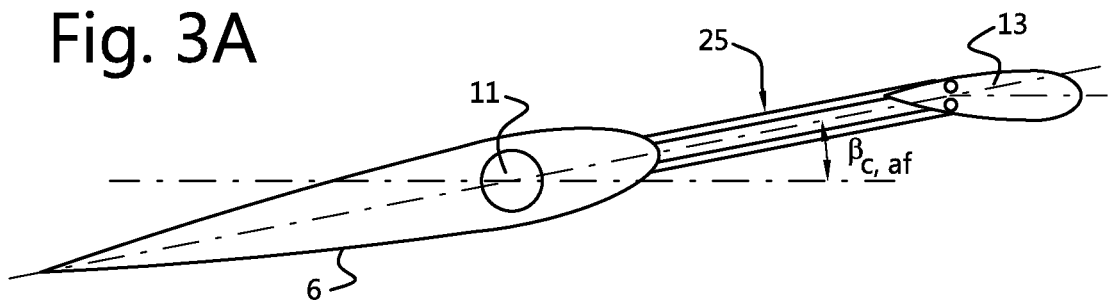
FIGS. 3a-3b show cross-sectional side views of the aft foil and the secondary foil being connected by a connecting device with a double-hinge arrangement.
Figure 3B:
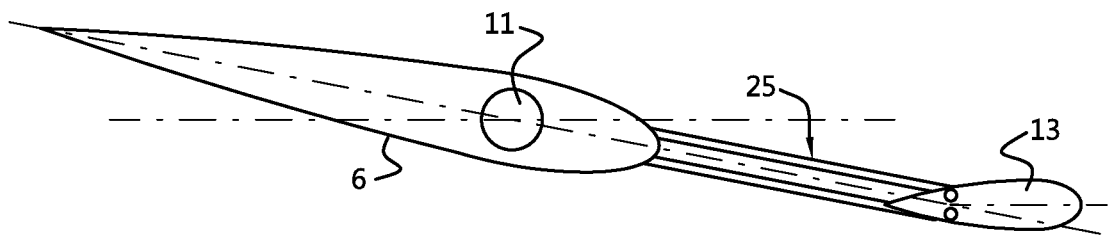

FIGS. 3a-3b show cross-sectional side views of the aft foil 6 and the secondary foil 13 being connected by a connecting device with a double-hinge arrangement 25. The double-hinge arrangement 25 works by having two hinge points on the secondary foil 13 (spaced-apart in a direction perpendicular to the chord $c_{sf}$ of the secondary foil 13, such as on opposite sides of the chord $c_{sf}$) to prevent "spontaneous" rotation of the secondary foil without a desired associated movement of the parallel linkage as shown, and, vice versa, to allow the parallel linkage to move as a result of a rotation of the aft foil 6, thereby rotating the secondary foil 13.

Figure 4A:
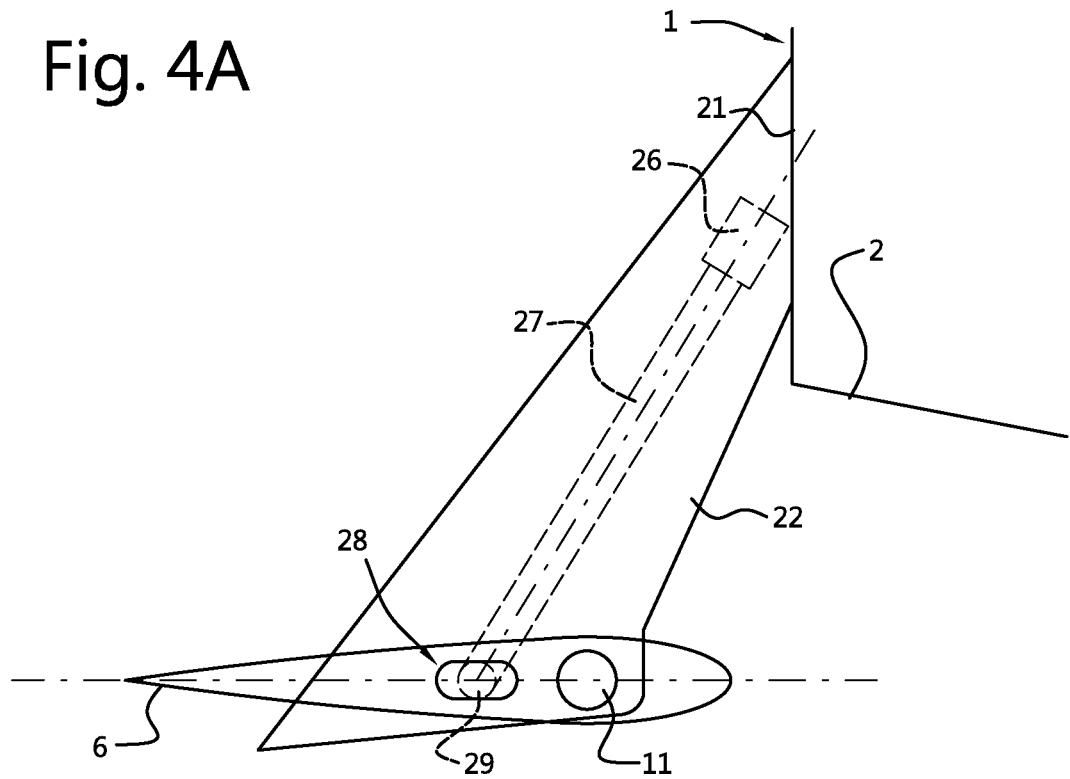
FIGS. 4a-4c show schematic cross-sectional side views of the aft foil with an actuating mechanism in the form of a piston/round bar arrangement, wherein the actuating mechanism connects to the aft foil at a position behind the shaft.
Figure 4B:
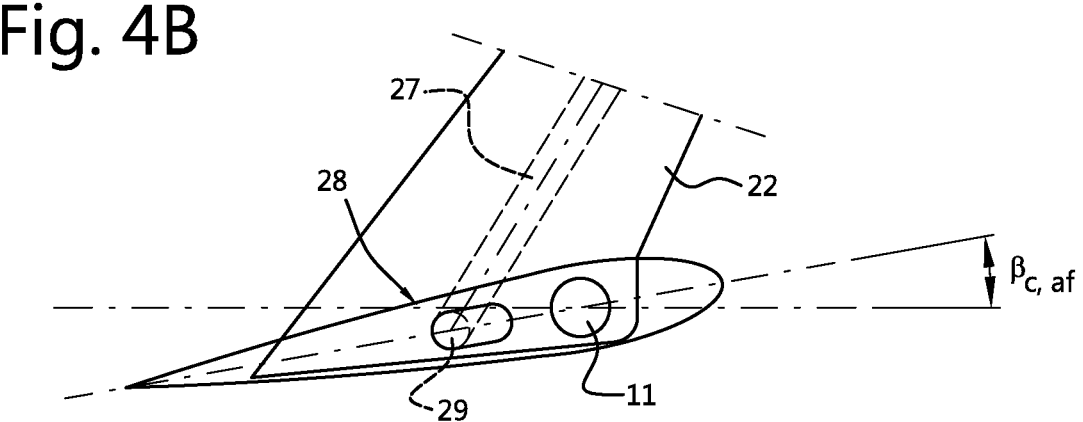
Figure 4C:
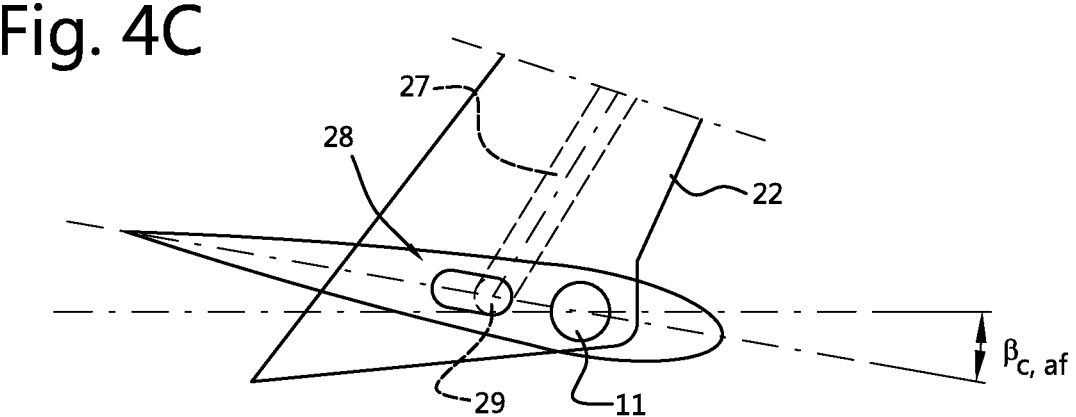

FIGS. 4a-4c show schematic cross-sectional side views of the aft foil 6 with an aft foil actuating mechanism 15 (see FIGS. 11b and 11d) in the form of a piston/round bar arrangement. The actuating mechanism 15 connects to the aft foil 6 at a position behind the shaft 11. The actuating mechanism 15 may comprise one or more rod actuators or one or more piston-cylinder actuators, or a combination thereof. As shown in FIG. 4a, the piston/round bar arrangement, comprising a piston 26 and a round bar 27, is arranged in (one or more) streamlined struts 22. At a lower end of the round bar 27 a pin 29 is arranged engaging a slot 28 in the aft foil 6. By moving the round bar 27 in a length direction thereof, the orientation of the aft foil 6 can be adjusted. The streamlined strut 22 is swept backwards and consequently the round bar 27 extends at an angle with respect to the vertical.

Figure 5:
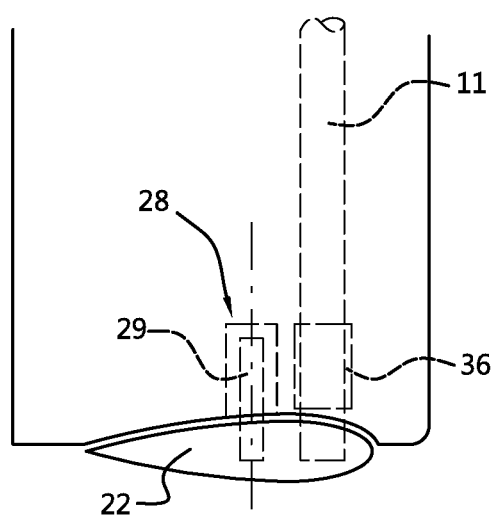
FIG. 5 shows a schematic cross-sectional plan view of the actuating mechanism according to FIGS. 4a-4c.

FIG. 5 shows a schematic cross-sectional plan view of the actuating mechanism according to FIG. 4a.

Figure 6A:
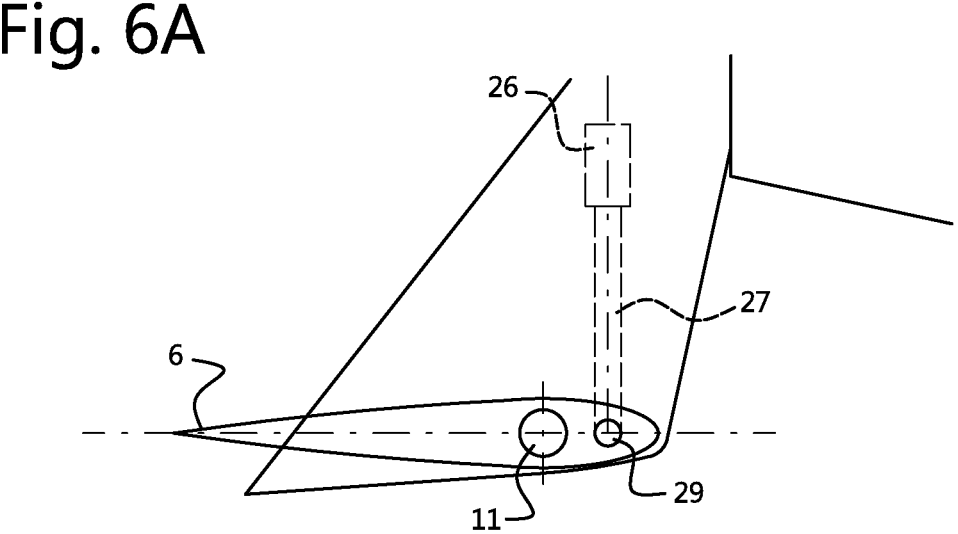
FIGS. 6a-6c show schematic cross-sectional side views of the aft foil with an actuating mechanism in the form of a piston/round bar arrangement, wherein the actuating mechanism connects to the aft foil at a position in front of the shaft.
Figure 6B:
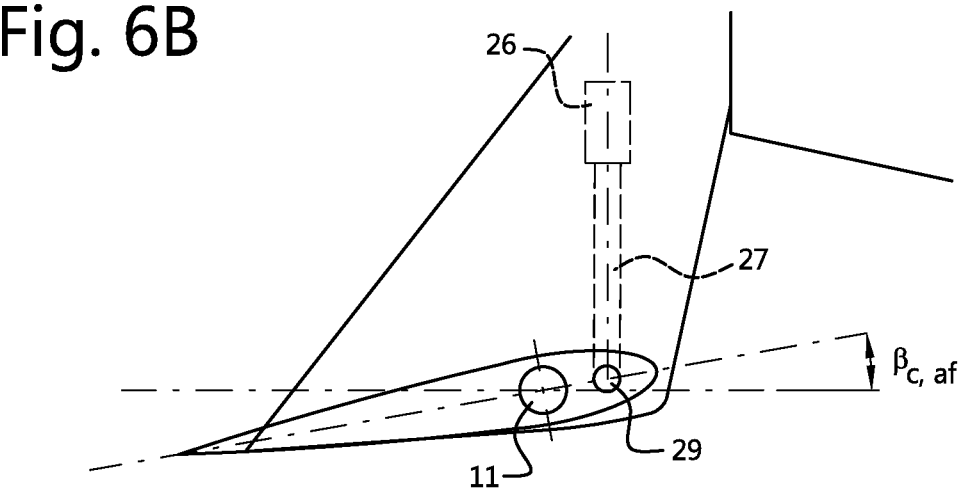
Figure 6C:
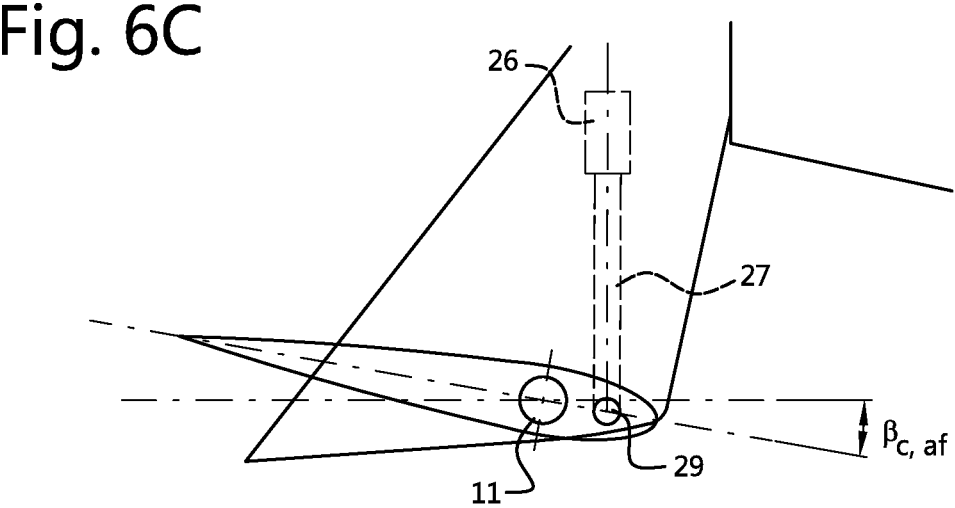

FIGS. 6a-6c show schematic cross-sectional side views of the aft foil 6 with an actuating mechanism 15 in the form of a piston/round bar arrangement, wherein the actuating mechanism 15 connects to the aft foil 6 at a position in front of the shaft 11. In contrast with the embodiment as shown in FIGS. 4a-4c and 5, the round bar 27 now extends (and is arranged to move) in a vertical direction.

Figure 7:
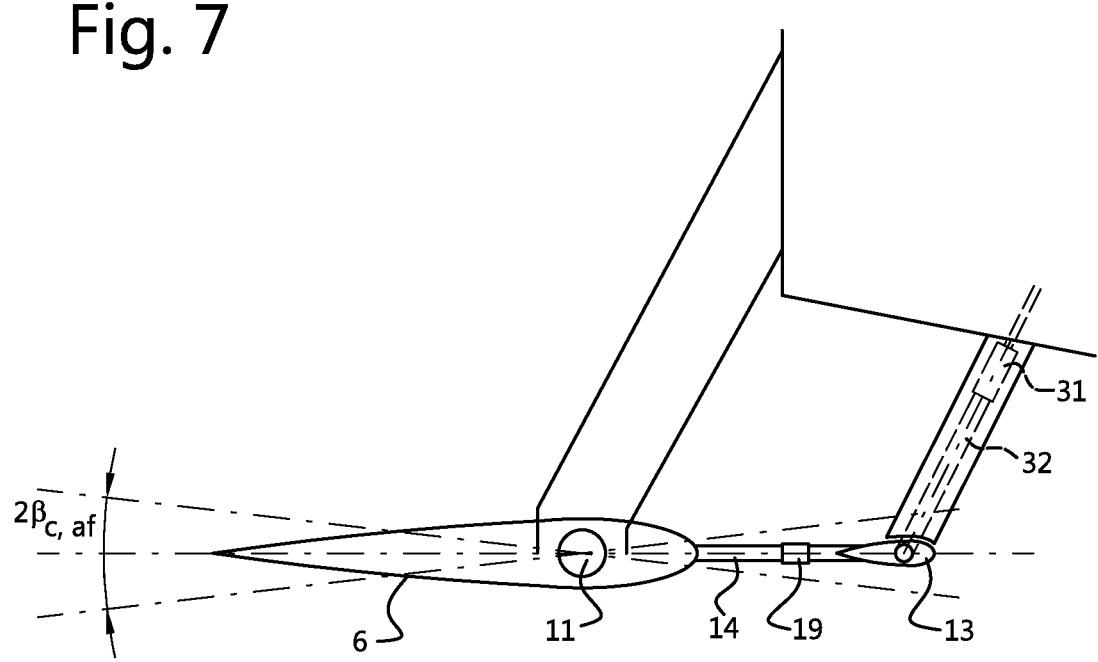
FIG. 7 shows a schematic cross-sectional side view of the aft foil and the secondary foil with an actuating mechanism in the form of a piston/round bar arrangement, wherein the actuating mechanism connects to the secondary foil.

FIG. 7 shows a schematic cross-sectional side view of the aft foil 6 and the secondary foil 13 with a secondary foil actuating mechanism 16 (please refer to FIG. 11c) in the form of a piston/round bar arrangement, wherein the actuating mechanism 16 connects to the secondary foil 13. The actuating mechanism 16 is arranged in a backwardly-swept strut 30 and is quite similar to the aft foil actuating mechanism 15 as described in the foregoing. The actuating mechanism 16 is used to rotate the secondary foil 13 and consequently to rotate the aft foil 6 around the shaft 11.

Figure 8A:
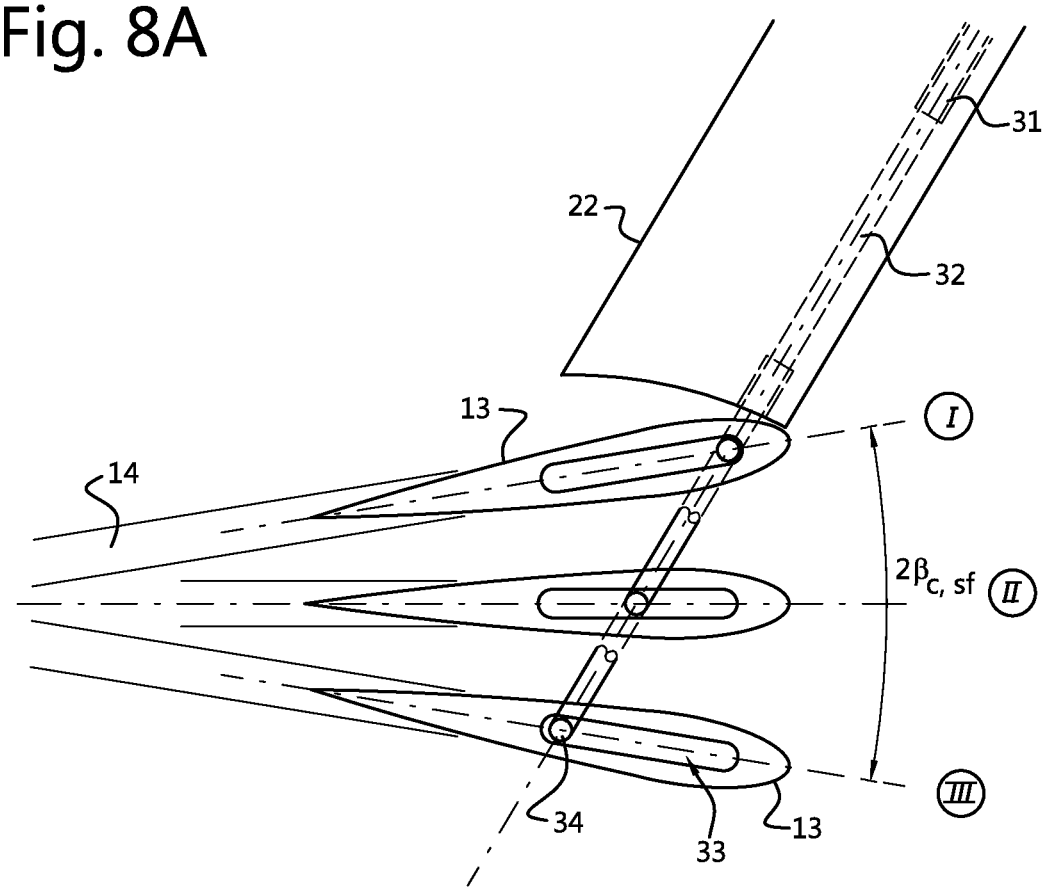
FIGS. 8a-8b show schematic cross-sectional side views of the secondary foil with an actuating mechanism in the form of a piston/round bar arrangement.

FIG. 8a shows a schematic cross-sectional side view of the secondary foil 13 with the actuating mechanism 16 in the form of a piston/round bar arrangement according to FIG. 6, with three different orientations of the secondary foil 13 (I, II, III) being shown. The connection to the secondary foil 13 here is in the form of a pin/slot connection, with a pin 34 being able to slide back and forth in an accompanying slot 33 in the secondary foil 13, along the chord $c_{sf}$ of the secondary foil 13. Another variant is shown in FIG. 8b with the bar 32 extending in a vertical direction (again with three orientations (I, II, III) of the secondary foil 13 being shown).

Figure 9:
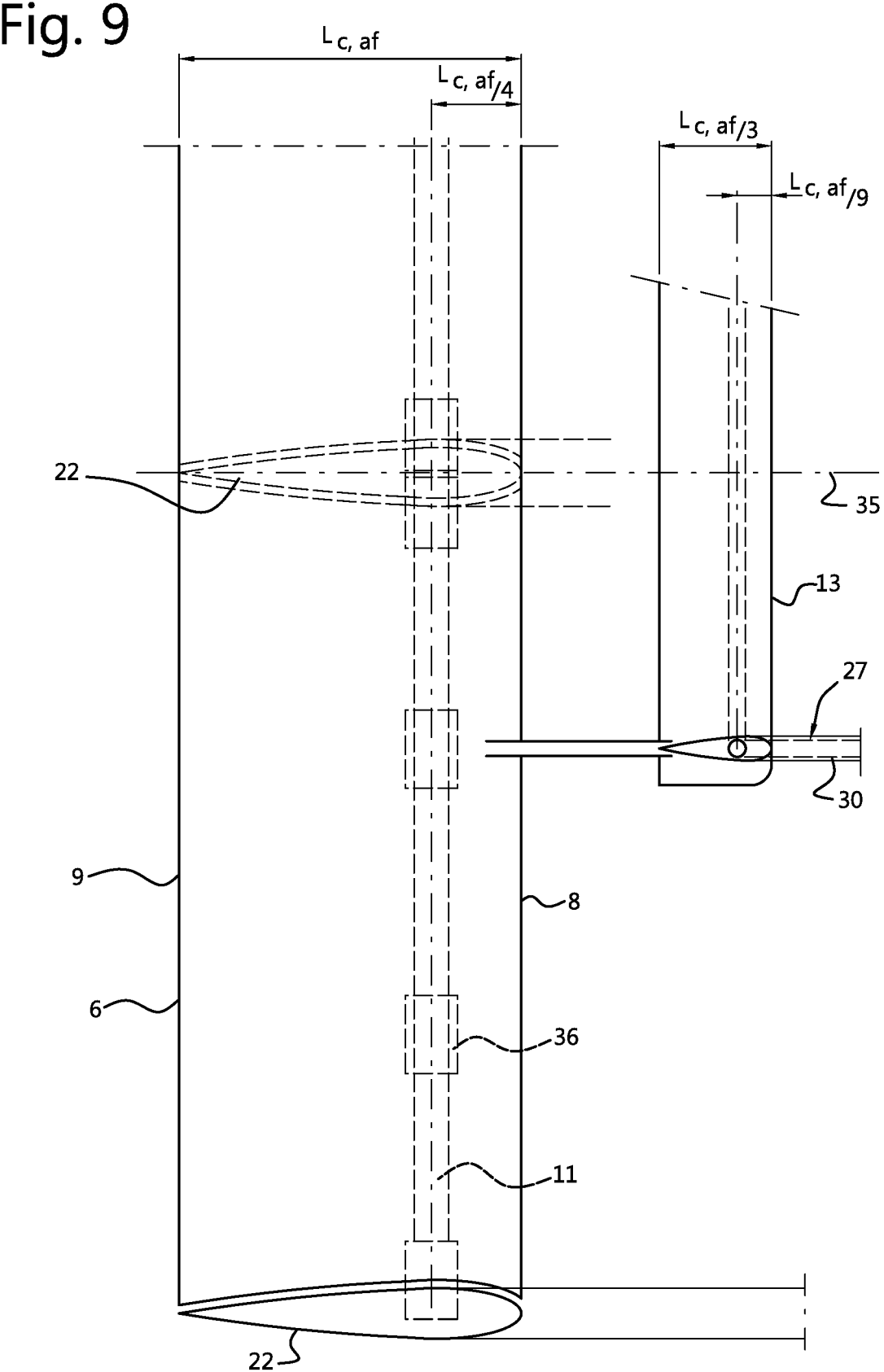
FIG. 9 shows a schematic plan view of the aft foil and the secondary foil with the piston/round bar arrangement fitted in secondary struts.

FIG. 9 shows a schematic plan view of the aft foil 6 and the secondary foil 13 with the piston/round bar arrangement fitted in the secondary struts 30 according to FIGS. 7 and 8a.

Figure 8B:
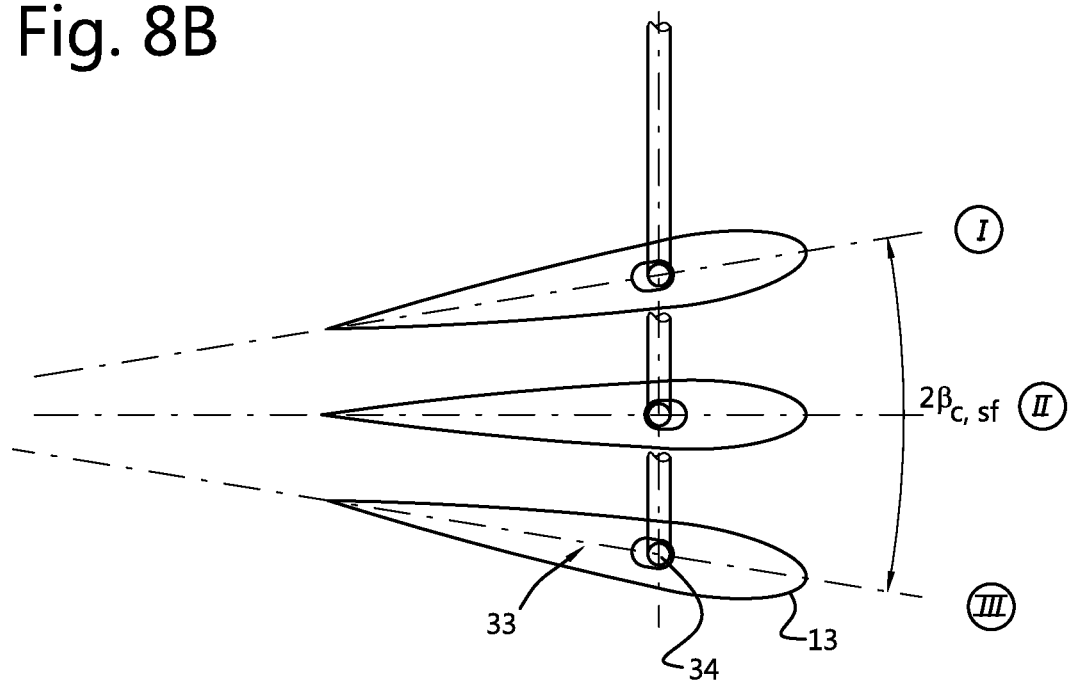
Figure 10:
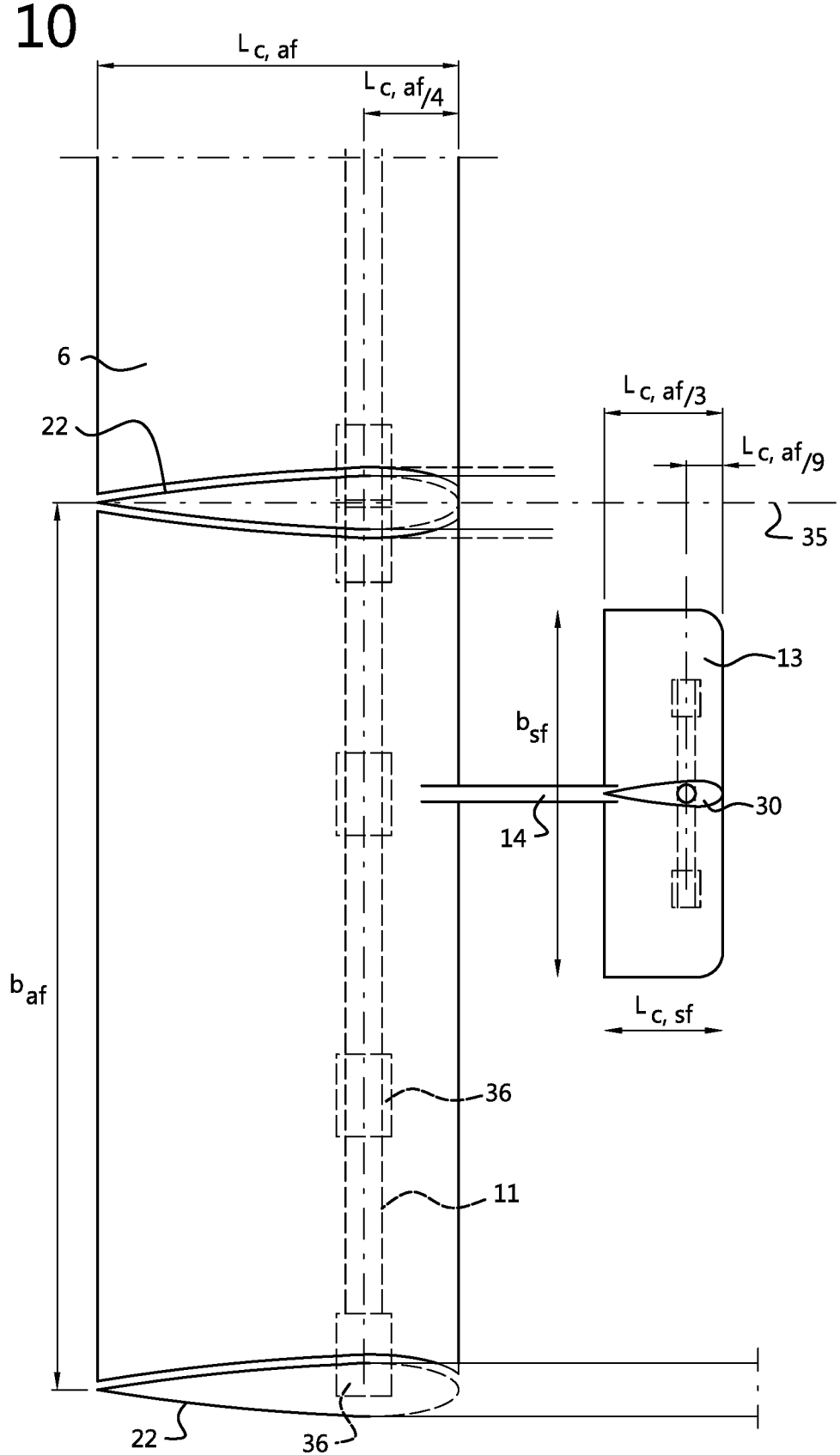
FIG. 10 shows a schematic plan view of the aft foil and the secondary foil, wherein the aft foil is separated in a port and starboard part to be separately activated by the adjustment means.

FIG. 10 shows a schematic plan view of the aft foil 6 and the secondary foil 13 with the piston/round bar arrangement fitted in secondary struts 30 according to FIG. 8b, comprising a pair of secondary foils 13 separated in a transverse direction of the vessel (although only one is shown, on one side of the plane of symmetry 35 of the vessel 1). Analogously, an associated pair of aft foils 6 is provided with each aft foil 6 being provided with individual adjustment means 10 in the form of an individual secondary foil 13. Multiple shaft bearings 36 are shown to support the shaft 11 at spaced-apart positions along the length of the shaft 11. Preferably, bearings 36 are arranged near the struts 22 and at intermediate positions (such as halfway) between the struts 22.

It should be noted that the dimensions shown in FIGS. 9 and 10 are merely exemplary.

Figure 11A:
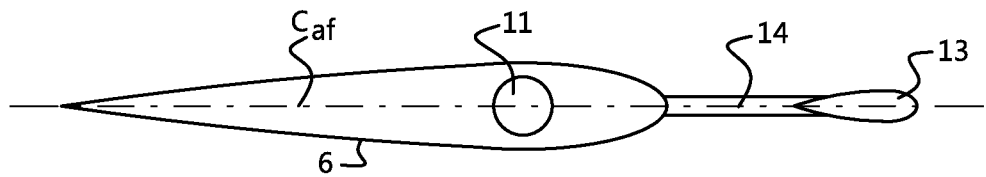
FIGS. 11a-11d summarize the main exemplary embodiments of the invention.
Figure 11B:
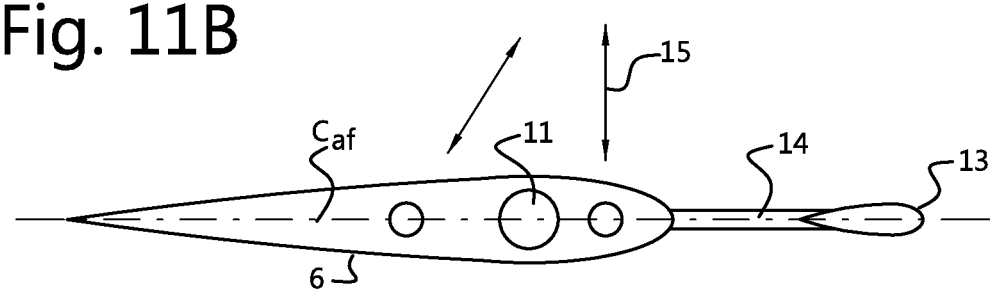
Figure 11C:
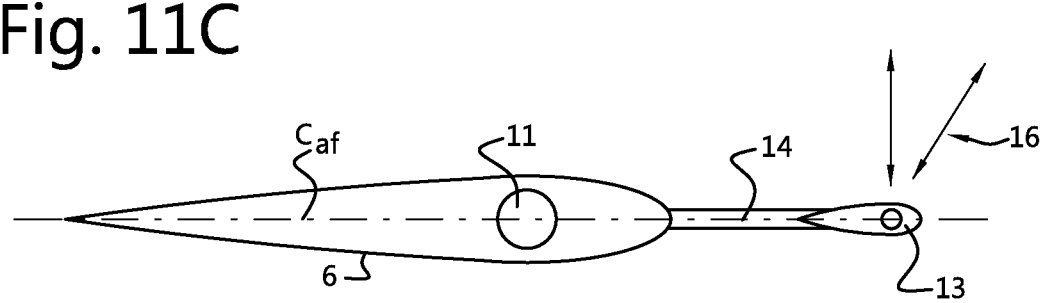
Figure 11D:
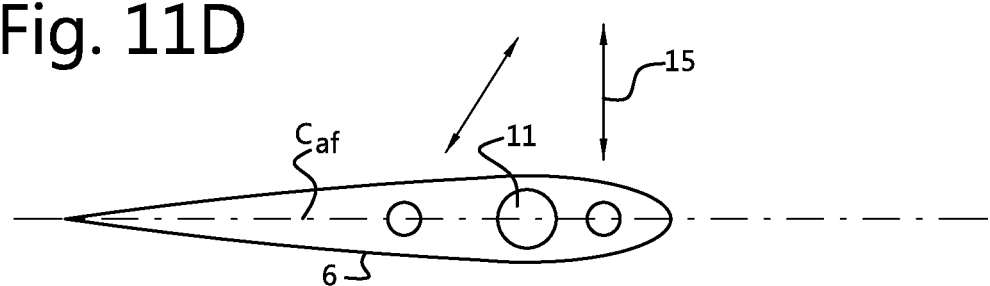

FIGS. 11a-11d show a summary of the main exemplary embodiments of the invention. From top to bottom, the "autonomous direct-lift configuration" is shown in FIG. 11a. The "powered lift-control configurations" are shown in FIGS. 11b and 11c, and FIG. 11d shows an exemplary embodiment of the "powered lift-control configuration" wherein the adjustment means 10 are connected to a control system for allowing the adjustment of the angle of incidence ($\beta_{c, af}$) of the chord of the aft foil 6 according to a cyclic pattern, whereby the aft foil 6 can perform a flapping motion for propelling the vessel 1. The secondary foil 13 is then omitted and the aforementioned actuating mechanism 15 can in principle be used for rotating the aft foil 6.

It should be clear that the description above is intended to illustrate the operation of preferred embodiments of the invention, and not to reduce the scope of protection of the invention. Starting from the above description, many embodiments will be conceivable to the skilled person within the inventive concept and scope of protection of the present invention.

LIST OF REFERENCE NUMERALS

1. Vessel
2. Hull
3. Waterline
4. Horizontal plane
5. Aft portion
6. Aft foil
7. Connecting member
8. Leading edge
9. Trailing edge
10. Adjustment means
11. Shaft
12. Stop device
13. Secondary foil
14. Connection device
15. Aft foil actuating mechanism
16. Secondary foil actuating mechanism
17. —
18. —
19. Force or strain gauge
20. Incoming flow
21. Transom
22. Strut for fixing aft foil at c/4
23. Cam (stop device)
24. Recess (stop device)
25. Double-hinge arrangement
26. Cylinder
27. Bar
28. Slot in aft foil
29. Pin (to engage slot in aft foil)
30. Strut for fixing secondary foil
31. Cylinder
32. Bar
33. Slot in secondary foil
34. Pin (to engage slot in secondary foil)
35. Plane of symmetry of vessel
36. Shaft bearing
$c_{af}$=chord of aft foil
$c_{sf}$=chord of secondary foil
$b_{af}$=span of aft foil
$b_{sf}$=span of secondary foil
$L_{c, af}$=chord length of aft foil
$L_{c, sf}$=chord length of secondary foil
$L_{af}$=lift force on aft foil
$L_{sf}$=lift force on secondary foil
$\beta_{c, af}$=angle of incidence of chord of aft foil
$\beta_{c, sf}$=angle of incidence of secondary foil
$\beta_{if}$=angle of incidence of incoming flow

The invention claimed is:

1. A vessel (1) for operating on a body of water comprising:
   a hull (2), designed for non-planing operation on the water body, during operation displaying a waterline (3) and having a forward direction in a horizontal plane (4) with a forward portion, an aft portion (5), and a central portion, the hull being configured to have the aft portion with a smaller water displacement relative to a water displacement of the central portion; and
   an aft, primary foil (6) affixed to the aft hull portion with one or more connecting members (7), configured to be below the waterline during operation, and spaced from the hull, the aft, primary foil having a span ($b_{af}$), a chord ($c_{af}$), a profile, a leading edge (8) and a trailing edge (9) relative to the forward direction, providing the aft foil with a configuration suitable for generating a lift force ($L_{af}$) having a forwardly-directed thrust component, wherein adjustment means (10) is connected to the aft foil, wherein the adjustment means are arranged for rotating the aft foil around a center of pressure, at or near a quarter-chord location of the aft foil, and configured for adjusting an angle of incidence ($\beta_{c,\,af}$) of the chord of the aft foil to an estimated or measured angle of incidence ($\beta_{if}$) of an incoming flow (20) upstream of the aft foil, below the hull, to obtain a highest possible thrust from the aft foil.

2. The vessel according to claim 1, wherein the aft foil is provided with a shaft (11) aligned in bearings (36) extending in a span-wise direction of the aft foil, at the center of pressure of the aft foil, wherein the adjustment means are configured for rotating the aft foil around the shaft.

3. The vessel according to claim 1, wherein the adjustment means are connected to a control system configured to allow for controlling the angle of incidence ($\beta_{c,\,af}$) of the chord of the aft foil according to a cyclic pattern, whereby the aft foil can perform a flapping motion for propelling the vessel.

4. The vessel according to claim 1, wherein the adjustment means are fitted with a stop device (12) to limit minimum and maximum angles of incidence ($\beta_{c,\,af\text{-}min}$, $\beta_{c,\,af\text{-}max}$) of the chord of the aft foil.

5. The vessel according to claim 1, wherein a secondary foil (13) is connected to the aft foil, upstream of the aft foil, via a connection device (14).

6. The vessel according to claim 5, wherein the secondary foil is connected to the aft foil via a connection device configured for allowing the chord of the secondary foil to keep an angle of incidence ($\beta_{c,\,sf}$) irrespective of the angle of incidence of the chord of the aft foil ($\beta_{c,\,af}$) to which the secondary foil is connected.

7. The vessel according to claim 5, wherein the secondary foil has a smaller span ($b_{sf}$) or smaller chord length ($L_{c,\,sf}$) than the aft foil.

8. The vessel according to claim 1, wherein the adjustment means comprise an actuating mechanism (15) connected to the aft foil.

9. The vessel according to claim 1, wherein the adjustment means comprise an actuating mechanism (16) connected to the secondary foil.

10. The vessel according to claim 6, wherein the aft foil and the secondary foil possess a symmetrical foil section.

11. The vessel according to claim 1, comprising two aft foils separated in a transverse direction of the vessel, each aft foil being provided with separate adjustment means (10).

12. The vessel according to claim 5, wherein the connection device comprises a force or strain gauge (19) to measure a lift force on the secondary foil.

13. A method for operating a vessel according to claim 1, comprising the step of operating the adjustment means for rotating the aft foil around a center of pressure, at or near a quarter-chord location of the aft foil, and for controlling the angle of incidence ($\beta_{c,\,af}$) of the chord of the aft foil ($c_{af}$) to an estimated or measured angle of incidence ($\beta_{if}$) of the incoming flow (20) upstream of the aft foil, below the hull, to obtain the highest possible thrust from the aft foil.

14. The method according to claim 13, comprising the step of determining the angle of incidence ($\beta_{if}$) of the incoming flow upstream of the aft foil from a lift force ($L_{sf}$) exerted on the secondary foil, the lift force ($L_{sf}$) being directly related to the angle of incidence ($\beta_{if}$) of the incoming flow.

15. The method according to claim 13, comprising the step of operating the control system to allow for controlling the angle of incidence ($\beta_{c,\,af}$) of the chord of the aft foil according to a cyclic pattern, whereby the aft foil can perform a flapping motion for propelling the vessel.

* * * * *